United States Patent
Yesilcimen et al.

(10) Patent No.: US 11,891,967 B2
(45) Date of Patent: Feb. 6, 2024

(54) TURBOFAN COMPRISING A POWER SUPPLY DEVICE TO DRIVE THE COMPRESSOR

(71) Applicant: SAFRAN AIRCRAFT ENGINES, Paris (FR)

(72) Inventors: Henri Yesilcimen, Moissy-Cramayel (FR); Caroline Marie Frantz, Moissy-Cramayel (FR); Nicolas Jérôme Jean Tantot, Moissy-Cramayel (FR); Nathalie Nowakowski, Moissy-Cramayel (FR); Gilles Alain Marie Charier, Moissy-Cramayel (FR); Kévin Morgane Lemarchand, Moissy-Cramayel (FR); Jonathan Evert Vlastuin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 270 days.

(21) Appl. No.: 17/277,801

(22) PCT Filed: Sep. 20, 2019

(86) PCT No.: PCT/FR2019/052211
§ 371 (c)(1),
(2) Date: Mar. 19, 2021

(87) PCT Pub. No.: WO2020/058652
PCT Pub. Date: Mar. 26, 2020

(65) Prior Publication Data
US 2021/0317800 A1    Oct. 14, 2021

(30) Foreign Application Priority Data

Sep. 21, 2018  (FR) .......................................  1858586
Sep. 21, 2018  (FR) .......................................  1858588

(51) Int. Cl.
*F02K 5/00*   (2006.01)
*F02C 6/20*   (2006.01)
(Continued)

(52) U.S. Cl.
CPC ................ *F02K 5/00* (2013.01); *F01D 15/10* (2013.01); *F02C 6/20* (2013.01); *F02K 3/00* (2013.01);
(Continued)

(58) Field of Classification Search
CPC ..... B64D 2027/026; F01D 15/10; F02C 7/36; F02K 3/06; F02K 5/00; F05D 2260/40311; F05D 2220/76
See application file for complete search history.

(56) References Cited

U.S. PATENT DOCUMENTS 7,882,693 B2    2/2011  Schilling
8,956,108 B2 *  2/2015  Eleftheriou ............. F02C 3/107
                                                        415/122.1

(Continued)

FOREIGN PATENT DOCUMENTS

EP    1936238 A2    6/2008
EP    3330515 A1    6/2018
(Continued)

OTHER PUBLICATIONS

Daly, Mark; et al. "Jane's Aero-Engines", Issue 28, Sep. 2010 (Year: 2010).*

(Continued)

*Primary Examiner* — Alain Chau
(74) *Attorney, Agent, or Firm* — Bookoff McAndrews, PLLC

(57) ABSTRACT

A turbofan includes a fan, a casing positioned downstream of the fan and separating a primary flowpath from a secondary flowpath, a compressor, a combustion chamber and
(Continued)

a turbine being arranged in the primary flowpath, the turbofan having a differential transmission coupled to the turbine, and a power supply device configured to provide additional power to the one provided by the turbine to drive the compressor.

20 Claims, 2 Drawing Sheets

(51) Int. Cl.
    *F02K 3/00*         (2006.01)
    *F01D 15/10*       (2006.01)
    *F02K 3/06*         (2006.01)
    *B64D 27/02*       (2006.01)

(52) U.S. Cl.
    CPC .......... *F02K 3/06* (2013.01); *B64D 2027/026* (2013.01); *F05D 2220/323* (2013.01); *F05D 2220/70* (2013.01); *F05D 2220/76* (2013.01); *F05D 2260/40311* (2013.01)

(56) References Cited

U.S. PATENT DOCUMENTS

| | | | | |
|---|---|---|---|---|
| 10,953,995 | B2* | 3/2021 | Gansler | B64D 27/02 |
| 11,008,883 | B2* | 5/2021 | Zatorski | F01D 15/10 |
| 11,149,649 | B2* | 10/2021 | Terwilliger | B64D 27/24 |
| 11,421,603 | B2* | 8/2022 | Nowakowski | F02C 7/36 |
| 11,542,872 | B2* | 1/2023 | Terwilliger | F02K 5/00 |
| 2004/0255590 | A1 | 12/2004 | Rago et al. | |
| 2010/0126178 | A1 | 5/2010 | Hyde et al. | |
| 2010/0218483 | A1* | 9/2010 | Smith | F01D 17/105 |
| | | | | 60/262 |
| 2013/0259652 | A1 | 10/2013 | Kupratis et al. | |
| 2013/0298522 | A1* | 11/2013 | Eleftheriou | F02C 3/107 |
| | | | | 60/39.01 |
| 2014/0205438 | A1* | 7/2014 | Hasel | F02C 7/36 |
| | | | | 415/124.1 |
| 2014/0290265 | A1 | 10/2014 | Ullyott et al. | |
| 2015/0292402 | A1* | 10/2015 | Razak | F02C 3/14 |
| | | | | 60/774 |
| 2015/0345427 | A1* | 12/2015 | Schwarz | F02C 3/06 |
| | | | | 60/226.1 |
| 2016/0010590 | A1* | 1/2016 | Rolt | F02K 1/15 |
| | | | | 60/805 |
| 2016/0102607 | A1 | 4/2016 | Hiernaux | |
| 2016/0131028 | A1 | 5/2016 | Lauer et al. | |
| 2018/0010551 | A1* | 1/2018 | Sheridan | F02C 7/36 |
| 2018/0073384 | A1* | 3/2018 | Bordoni | F01D 19/00 |
| 2019/0002113 | A1* | 1/2019 | Gansler | F01D 15/10 |
| 2019/0085714 | A1* | 3/2019 | Zatorski | B64D 27/10 |
| 2020/0056546 | A1* | 2/2020 | Terwilliger | F02C 9/54 |
| 2021/0348566 | A1* | 11/2021 | Nowakowski | F02C 7/36 |

FOREIGN PATENT DOCUMENTS

| | | |
|---|---|---|
| FR | 2360758 A1 | 3/1978 |
| WO | 2015031143 A1 | 3/2015 |

OTHER PUBLICATIONS

French Search Report in FR Application No. 1858588, dated May 10, 2019 (2 pages).
International Search Report issued in International Application No. PCT/FR2019/052211, dated Jan. 16, 2020 (3 pages).
Mark Daly et al., "Aero-Engines," Jane's, Mar. 1, 2008, pp. 706-712 (5 pages).
Written Opinion on Patentability issued in French Patent Application No. 1858588, dated Mar. 26, 2020, (4 pages).
International Civil Aviation Organization, "Manual of the ICAO Standard Atmosphere," Doc. 7488/3, 3rd edition, 1993 (14 pages).
International Search Report issued in International Patent Application No. PCT/FR2019/052212, dated Dec. 17, 2019 (2 pages).
French Search Report in FR 1858584, dated May 14, 2019 (2 pages).

* cited by examiner

TURBOFAN COMPRISING A POWER SUPPLY DEVICE TO DRIVE THE COMPRESSOR

CROSS-REFERENCE TO RELATED APPLICATION(S)

This application is the U.S. national phase entry under 35 U.S.C. § 371 of International Application No. PCT/FR2019/052211, filed on Sep. 20, 2019, which claims priority to French Patent Application No. 1858586, filed on Sep. 21, 2018, and French Patent Application No. 1858588, filed on Sep. 21, 2018.

TECHNICAL FIELD

The present disclosure relates to the field of aircrafts, and more particularly a turbojet engine that may be used for the aeronautical propulsion.

TECHNOLOGICAL BACKGROUND

In recent years, aircraft engines have undergone numerous improvements, which have allowed increasing their performances and significantly reducing their fuel consumption and their emission of greenhouse gases. Currently, the efforts required to obtain similar gains in future years are proportionally much higher. This implies considerably increased costs, but also increasing complexity of the systems implemented, so that the operability of the engines and their performance/cost ratio could deteriorate.

Therefore, there exists a need for a new type of aircraft engine, in particular a turbojet engine, which forms a more acceptable compromise between different parameters such as specific fuel consumption, drag, geometry, mass, simplicity and costs.

GENERAL PRESENTATION

To this end, the present disclosure relates to a turbofan comprising a fan, a casing positioned downstream of the fan and separating a primary flowpath from a secondary flowpath, a compressor, a combustion chamber, and a turbine having been arranged in the primary flowpath, the turbofan comprising a differential transmission coupled to the turbine and a power supply device configured to provide additional power to that provided by the turbine to drive the compressor.

In the present disclosure, what is called the axis of the turbofan is its axis of symmetry or of quasi-symmetry which forms the axis of rotation of the compressor and of the turbine. The axial direction corresponds to the direction of the axis of the turbofan and a radial direction is a direction perpendicular to this axis and intersecting this axis. Likewise, an axial plane is a plane containing the axis of the turbofan and a radial plane is a plane perpendicular to this axis. A circumference is understood to be a circle belonging to a radial plane and the center of which belongs to the axis of the turbofan. A tangential or circumferential direction is a direction tangent to a circumference; it is perpendicular to the axis of the turbofan but does not pass through the axis.

Unless otherwise specified, the adjectives front and rear are used with reference to the axial direction, it being understood that the inlet to the turbofan is located on the front side of the turbofan, while its outlet is located on the rear side. The adjectives upstream and downstream are used with reference to the normal direction of flow of gases in the turbofan.

Finally, unless otherwise specified, the adjectives interior (internal) and exterior (external) are used with reference to a radial direction so that the interior portion of an element is, in a radial direction, closer to the axis of the turbofan that the exterior portion of the same element.

The turbofan is called turbofan in that it comprises a primary flowpath accommodating a primary flow and a secondary flowpath accommodating a secondary flow. The casing separating the primary flowpath and the secondary flowpath is sometimes called the internal casing.

As indicated, the differential transmission is coupled to the turbine, i.e. there exists a functional, possibly permanent connection, between the turbine and the differential transmission. The differential transmission may be configured to drive the fan and/or the compressor due to the mechanical energy provided by the turbine. The differential transmission is a power transmission allowing modifying the speed and/or the torque ratio between at least one input, in this case the turbine, and at least one output, in this case the fan and/or the compressor. Within the meaning of the present disclosure, the differential transmission may have a transmission ratio less than one, in which case it is sometimes called a reduction system, but also greater than one, depending on what is considered to be the input or the output, in which case it is sometimes called a multiplier system. The differential transmission may be electromechanical or purely mechanical.

The turbofan may be a single-spool turbofan. A single-spool turbofan comprises a single rotating assembly, connecting one or more compressors to one or more turbines via a common kinematic system, which does not mean that all the components rotate at the same speed, but rather that their rotations are linked. By opposition, a two-spool turbofan comprises two kinematically independent rotating assemblies, each of these assembly connecting its own compressors and turbines via its own kinematic system independent of that of the other assembly. Hereafter, for the sake of conciseness but without loss of generality, it will be assumed that the single-spool comprises one compressor and one turbine.

Unlike current developments which are based in great majority, if not totally, on two-spool turbofans, the present disclosure proposes to implement a turbofan with a single spool. An architecture of this type allows greatly simplifying the turbofan, for example due to the suppression of complex members such as shafts, bearings and supports, reducing its mass and its cost.

In addition, due to the fact that the turbofan comprises a power supply device configured to provide additional power to that provided by the turbine to drive the compressor, it is possible, depending on the speed, to cause the compressor to operate in a desired operating range while the turbine alone, at the speed in question, particularly at low speed, would not allow operation in this range. As a result, the performance of the turbofan is of a level comparable to those of other existing turbofans, regardless of the turbofan speed, or having a much better performance/cost ratio than an existing turbofan.

In some embodiments, the turbofan further comprises a control unit configured to control the power supply device depending on a rotation speed of the turbine. Thus, the power supply device can be controlled depending on the speed of the turbofan. This allows accurately adapting the parameters of the turbofan and optimizing the operation of the turbofan.

In some embodiments, the power supply device comprises an electric motor configured to drive the compressor in rotation. In these embodiments, the power supply device can be controlled in a very flexible manner, depending on the need for power, in particular continuously over a range covering zero power to the maximum sizing power of the power supply device.

In some embodiments, the power supply device comprises an electrical generator configured to be driven by the turbine. The electrical generator may be configured to supply the aforementioned electric motor, directly or via electricity storing means.

In fact, in some embodiments, the turbofan comprises electricity storing means electrically connected to the electric motor or to the electrical generator. Thus, during some phases of flight, for example at high speed, the turbine may drive the electrical generator so that the excess mechanical power is stored, in the form of electricity, in the electricity storing means. During other phases of flight, for example at low speed, the compressor may be driven by the turbine and by the electric motor, the electric motor deriving its energy from the electricity storing means. However, other variants are possible. For example, instead of being recharged by a generator driven by the turbine, the electricity storing means can be recharged by means of a power supply external to the turbofan.

Thus, in some embodiments, the power supply device comprises a connector configured to be connected to an external electrical power supply.

In some embodiments, the power supply device comprises a variable mechanical transmission coupled on the one hand to the shaft of the compressor, and on the other hand to the shaft of the turbine. Thus, the variable mechanical transmission allows tapping from the turbine power for driving the compressor, said power being able to be controlled, for example depending on the turbofan speed. The variable mechanical transmission may be connected or disconnected from the compressor and/or from the turbine. The variable mechanical transmission may transmit a fixed or variable proportion of the power of the turbine to the compressor. The variable mechanical transmission may comprise any one of the following elements: a clutch, a gearbox, a variator, etc.

In some embodiments, the power supply device comprises an electromagnetic transmission coupled on the one hand to the shaft of the compressor, and on the other hand to the shaft of the turbine. The electromagnetic transmission may, for example, be a magnetically geared transmission. An electromagnetic transmission has numerous advantages, particularly the absence of mechanical fatigue, of lubrication, of losses due to mechanical contacts, of noise, as well as high efficiency.

In some embodiments, the maximum additional power provided by the power supply device is greater than 1.5 megawatts (MW). Such an additional maximum power is useful for compensating the power not provided by the turbine at certain speeds of the turbofan.

In some embodiments, the power supply device is configured to be deactivated when the rotation speed of the turbine is greater than 95% of the nominal maximum rotation speed of the turbine. Thus, it is possible to dimension the power supply device only for operation at moderate mechanical speeds where its role is useful, thus minimizing its mass and its complexity. For example, the power supply device may be configured to be deactivated when the rotation speed of the turbine is sufficient for driving the compressor alone at a reduced speed of at least 50% of the nominal speed, preferably at least 70%. Conversely, the power supply device may be configured to be activated when the rotation speed of the turbine is insufficient to drive the compressor alone at a reduced speed of at least 50% of the nominal speed, preferably at least 70%.

The present disclosure also relates to a single-spool turbofan comprising a fan, a casing positioned downstream of the fan and separating a primary flowpath from a secondary flowpath, a compressor, a combustion chamber, and a turbine being arranged in the primary flowpath, the turbofan comprising a differential transmission coupled to the turbine, wherein the by-pass ratio between the secondary flowpath and the primary flowpath is greater than or equal to 12.

The by-pass ratio between the secondary flowpath and the primary flowpath, more simply called by-pass ratio (BPR), is the ratio of the flow rate of air entering the secondary flowpath to the flow rate of air entering the primary flowpath. Increasing the BPR allows increasing the performance of the turbofan, in that the thrust is essentially provided by the air swept by the fan and which passes through the secondary flowpath.

However, increasing the BPR requires increasing the diameter of the fan, which leads to jointly increasing the cross section of the secondary flowpath.

Due to the fact that the by-pass ratio between the secondary flowpath and the primary flowpath is greater than or equal to 12, the performance of the turbofan is further improved. For example, a by-pass ratio of this type can be obtained within the context of a subsonic ejection speed at the turbofan exhaust, preferably between Mach 0.8 and Mach 1 at the throat of the ejection nozzle, for a corresponding aircraft speed comprised between Mach 0.7 and Mach 0.9.

In some embodiments, the differential transmission comprises a first reduction gear configured to modify the rotation speed transmission ratio between the turbine and the fan, and a second reduction gear configured to modify the rotation speed transmission ratio between the turbine and the compressor.

Thus, the rotation of the fan can be decoupled from the rotation of the compressor, which allows having, for these two components, different rotation speeds. This allows maintaining the rotation speed of the compressor at a certain level while reducing the rotation speed of the fan. However, the rotation speed of the fan conditions the tangential speed of the radially external part of the fan blades, also called the blade tip. The speed of the blade tip must satisfy certain constraints, particularly remaining subsonic, for example less than or equal to 310 meters per second (m/s). Consequently, the fact of being able to reduce the rotation speed of the fan allows, at equal blade tip speed, increasing the diameter of the fan. The result is still better performance for the turbofan.

In some embodiments, the second reduction gear is coupled to an output of the first reduction gear.

In some embodiments, the first reduction gear is a differential reduction gear having an input wheel rotatably secured to the turbine, a first output wheel rotatably secured to the fan, a second output wheel rotatably secured to an input wheel of the second reduction gear, and the second reduction gear is an epicyclic reduction gear having an output wheel rotatably secured to the compressor.

A reduction gear is a device allowing modifying the speed and/or the torque ratio between at least one input wheel and at least one output wheel. Within the meaning of the present disclosure, a reduction gear may have a transmission ratio less than one, but also greater than one, depending on which is considered to be the input and the output (a reduction gear is a generally reversible transmission), in which case it is sometimes called a multiplier. A differential reduction gear can associate the rotation of three wheels, for example one input wheel and two output wheels. An epicyclic reduction gear can associate the rotation of two wheels, for example one input wheel and one output wheel.

The differential reduction gear and/or the epicyclic reduction gear may be designed in the form of an epicyclic gear train. An epicyclic gear train generally has an external planetary gear, also called a ring gear, as well as an internal planetary gear, also called a planetary gear or sun gear. The sun gear and the ring gear are coupled by means of one or more planet gears, the planet gears being coupled together by a planet carrier. Within the meaning of the present disclosure, what is called a "wheel" in the generic sense is any one of the ring gear, the planet carrier, or the sun gear. Each wheel can be used as the input or output of a mechanical transmission.

In this case, the rotation of the turbine is transmitted, via the first reduction gear, to the fan. The result is a first transmission ratio, for example a first torque ratio, between the turbine and the fan. The second output wheel of the first reduction gear drives an input wheel of the second reduction gear, the output of which drives the compressor. The result is a second transmission ratio between the turbine and the compressor. Thus, the use of a differential reduction gear allows decoupling the rotation of the fan and of the compressor. To limit the complexity of the turbofan, the epicyclic reduction gear can be coupled to the differential reduction gear and not directly to the turbine.

In some embodiments, the ratio of the number of teeth of the first output wheel of the first reduction gear to the number of teeth of the input wheel of the first reduction gear is greater than 1. This ratio may be greater than 1.2, more preferably greater than 1.4. In addition, this ratio may be less than 1.8, more preferably less than 1.6. This ratio may be approximately equal to 1.5. In the case of nominal operation, the first reduction gear is therefore configured to provide to the fan a lower rotation speed than the one provided to the compressor.

In some embodiments, the ratio of the number of teeth of the ring gear of the second reduction gear to the number of teeth of the output wheel of the second reduction gear is greater than 2. In the case of an epicyclic gear train, the ring gear of the second reduction gear can be fixed relative to the internal casing of the turbofan. This ratio allows increasing the rotation speed of the compressor relative to the speed provided at the input of the second reduction gear by the first reduction gear. This ratio may be greater than 5, more preferably greater than 6. In addition, this ratio may be less than 9, more preferably less than 8. This ratio may be approximately equal to 7.

In some embodiments, the ratio of the number of teeth of the first output wheel of the first reduction gear to the number of teeth of the input wheel of the first reduction gear is less than the ratio of the number of teeth of the ring gear of the second reduction gear over the number of teeth of the output wheel of the second reduction gear. This is the ratio of the two aforementioned ratios; it can also be verified, in the examples given, that 1.5 is less than 7. In this configuration, the diameter of the different wheels of the differential transmission can be reduced and the overall cost of product of the differential transmission can be limited.

In some embodiments, the second reduction gear has a transmission ratio greater than 3. The transmission ratio is the ratio of the rotation speed of the output wheel to the rotation speed of the input wheel. In the case of planet gears, it is rotation speed of the planet carrier that is considered, which corresponds to the speed of revolution of the planet gears around the sun gear and not to the rotation speed of the planet gears around themselves.

This transmission ratio may be greater than 6, more preferably greater than 7. In addition, this ratio may be less than 10, more preferably less than 9. This ratio may be approximately equal to 8.

In some embodiments, the compression ratio of the fan at cruising speed is comprised between 1.3 and 1.45. In conformity with the usual definition, what is called the compression ratio of the fan is the ratio of the volume-averaged total pressure of a given mass of air at the input of the fan to the volume-averaged total pressure of the same mass of air at the output of the fan. A relatively low compression ratio allows increasing the performance of the turbofan.

In some embodiments, the compression ratio of the compressor is greater than or equal to 25 at a rotation speed of the compressor of 15,500 revolutions per minute. Such a compression ratio is suited to the aerodynamics of the compressor and the turbine. For example, the compressor may comprise at least eight stages of moving blades, preferably at least nine or ten stages.

In some embodiments, the overall pressure ratio is greater than or equal to 30 at top of climb. The overall pressure ratio, or OPR, is the ratio of the total pressure of the air at the output of the compressor to the total pressure of the air at the input of the fan. The point called "top of climb" is the point at which the rise to altitude is completed this point conventionally being calculated so that the rise is as economical and short as possible. A high OPR allows improving the thermal efficiency, hence the performance, of the gas generator of the turbofan. An OPR comprised between 30 and 40 may seem less advantageous than in two-spool turbofans, but this is compensated by a large improvement in simplicity, in operability and in cost.

Moreover, unless otherwise stated, the values of the quantities mentioned in the present disclosure are measured when the turbofan is stationary in a standard atmosphere, as defined by the manual of the International Civil Aviation Organization (ICAO), Doc 7488/3, $3^{rd}$ edition, and at sea level.

The present disclosure also relates to a turbofan comprising a fan, a compressor, a combustion chamber, a turbine configured to drive the fan in rotation via a first reduction gear and the compressor via a second reduction gear, wherein an output of the first reduction gear is coupled in rotation with an input of the second reduction gear by a reduction shaft, the reduction shaft being supported by a bearing arranged between the first reduction gear and the second reduction gear.

Thus, it is understood that the aforementioned bearing may be arranged axially between the first reduction gear and the second reduction gear. The bearing may be supported relative to a fixed casing of the turbofan, particularly fixed relative to the combustion chamber.

Due to the fact that the reduction shaft is supported by a bearing arranged between the first reduction gear and the second reduction gear, the turbofan has a good dynamic situation, i.e. good mechanical and aerodynamic behavior at operating speed, and principal natural vibration modes, i.e.

capable of causing damage to the turbofan, located outside the operating speed. In addition, said bearing allows properly holding the first reduction gear and the second reduction gear, while avoiding or limiting dynamic coupling between these two reduction gears.

In some embodiments, the bearing is a roller bearing. Said bearing therefore allows axial movement of the reduction shaft.

In some embodiments, the bearing is supported by said casing. Due to the fact that the bearing is supported by the internal casing, the support structure of the bearing can be simplified, which limits the increase of the mass of the turbofan, simplifies its general structure and improves its performance.

In some embodiments, said bearing is arranged radially outside the compressor shaft, the turbine shaft, and the reduction shaft. This allows further optimization of the dynamic situation of the turbofan.

In some embodiments, the reduction shaft is a planet carrier common to the first reduction gear and to the second reduction gear.

Besides the features which have just been mentioned, the proposed turbofan may comprise one or more other bearings depending on the features among the following, considered in isolation or in technically possible combinations:
  a fan bearing arranged between the fan shaft and the casing. The fan bearing supports the fan shaft relative to the casing;
  a compressor bearing arranged between the compressor shaft and the casing. The compressor bearing, also called the first compressor bearing, supports the compressor shaft relative to the casing;
  a second bearing, such as a roller bearing, arranged to support the reduction shaft. The fact of using two roller bearings to support the reduction gear avoids static indeterminacy;
  an inter-shaft bearing, a roller bearing for example, arranged between the compressor shaft and the turbine shaft. The inter-shaft bearing may be arranged radially between the compressor shaft and the turbine shaft and support these two shafts relative to one another;
  a compressor bearing arranged between the compressor shaft and a structural member downstream of the compressor, said structural member possibly being, for example, the casing of the combustion chamber or the diffuser located between the compressor and the combustion chamber. The compressor bearing, also called the second compressor bearing, supports the compressor shaft relative to the structural member.

BRIEF DESCRIPTION OF THE DRAWINGS

The invention and its advantages will be better understood upon reading the detailed description that follows, of embodiments given by way of non-limiting examples. This description refers to the appended drawings, in which.

DETAILED DESCRIPTION OF EMBODIMENTS

Figure 1:
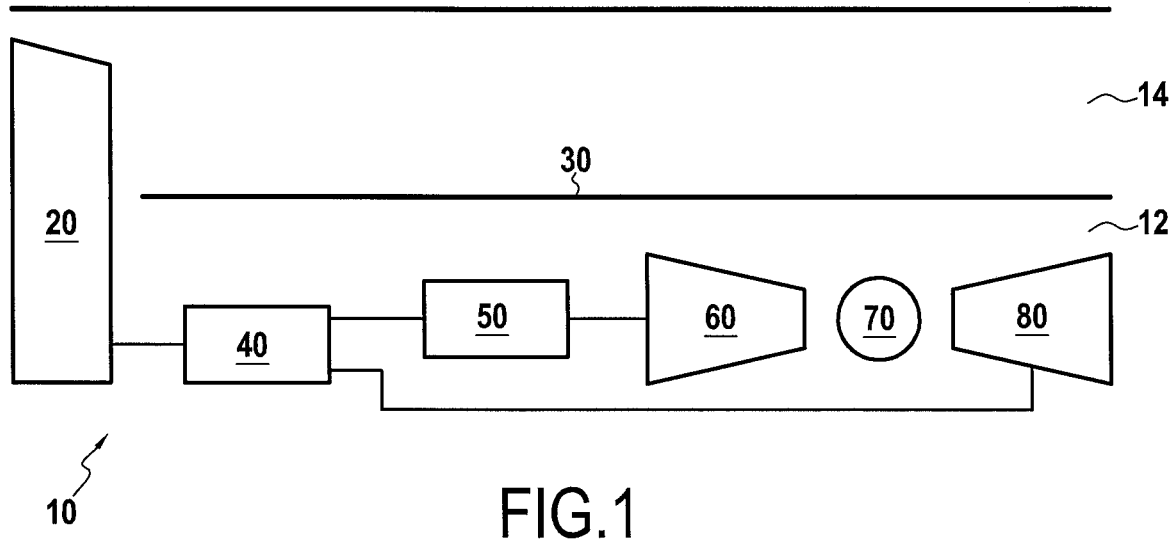
FIG. 1 is a schematic view of a turbofan according to one embodiment.

A turbojet engine 10 according to one embodiment is schematically represented in FIG. 1. In this case, the turbojet engine 10 is a single-spool turbofan engine. Indeed, the turbojet engine 10 comprises a fan 20, an inner casing 30 disposed downstream of the fan 20 and separating a primary flowpath 12 from a secondary flowpath 14. A compressor 60, a combustion chamber 70 and a turbine 80 are arranged in the primary flowpath 12, from upstream to downstream. Due to the fact that the turbojet engine 10 is a single-spool engine, it includes a single rotating assembly comprising the compressor 60 and the turbine 80. In this case, the turbojet engine comprises a single compressor 60 driven directly or indirectly by a single turbine 80, the turbine 80 being set in motion by the combustion gases derived from the combustion chamber 70.

The fan 20 may comprise a blade wheel. The fan 20 may be dimensioned so that its compression ratio at cruising speed is comprised between 1.3 and 1.45, at a rotational speed of about 2,600 rpm. The diameter of the fan 20 may be comprised between 2 and 2.7 meters, more specifically between 2.2 meters and 2.4 meters. It will be understood here by "diameter of the fan 20" the radial distance between the axis of the turbojet engine 10 and the fan blade tip.

The compressor 60 may comprise between five and fifteen stages, in particular between eight and twelve stages, preferably about ten stages, each stage being formed of a vane wheel and a blade wheel. It should be recalled that the blades of the stages of the same compressor are rotatably secured about the axis of the compressor. The compressor may be dimensioned so that its compression ratio is greater than or equal to twenty-five at a rotational speed of approximately 15,500 rpm, which may correspond to the cruising speed.

Thus, in this embodiment, the OPR of the turbojet engine 10 may be greater than or equal to thirty.

The turbine 80 may comprise between two and six stages, in particular between three and five stages, preferably about four stages. It is recalled that the blades of the stages of the same turbine are rotatably secured about the axis of the turbine. The turbine may be provided to rotate at approximately 8,600 rpm at cruising speed.

In this embodiment, the turbine 80 rotatably drives the compressor 60. The turbine 80 also rotatably drives the fan 20. More specifically, the turbojet engine 10 comprises a differential transmission coupled to the turbine 80. In this case, as illustrated in FIG. 1, the differential transmission is coupled to the fan 20 and to the compressor 60 and comprises, here, a first reduction gear 40 configured to modify the rotational speed transmission ratio between the turbine 80 and the fan 20, and a second reduction gear 50 configured to modify the rotational speed transmission ratio between the turbine 80 and the compressor 60.

In this embodiment, the by-pass ratio between the secondary flowpath 14 and the primary flowpath 12, also called BPR, is greater than or equal to twelve, preferably greater than or equal to fourteen, or even 14.5. In this embodiment, such a BPR may be achieved thanks to the diameter of the fan, to the compression ratio of the fan and to the number of stages of the turbine 80. However, other parameters could be involved: for example, a high BPR may also be achieved by the joint increase of the OPR and of the inlet temperature of the turbine, this conjunction contributing to reducing the mass flow rate of the primary flowpath, therefore increasing the BPR.

As indicated above, in the turbojet engine 10, the rotational speed of the fan 20 can be decoupled from that of the compressor 60. For example, the ratio of the rotational speed of the compressor 60 to the rotational speed of the fan 20 may be comprised between 5.5 and 6.5 at full power points. In addition, unlike a single differential reduction gear, the use of two reduction gears allows alleviating the mechanical and aerodynamic stresses on the turbine 80.

FIGS. 2 to 5 present the turbojet engine 10 in other embodiments. In these figures, the elements corresponding or identical to those of the first embodiment will receive the same reference sign and will not be described again.

Figure 2:
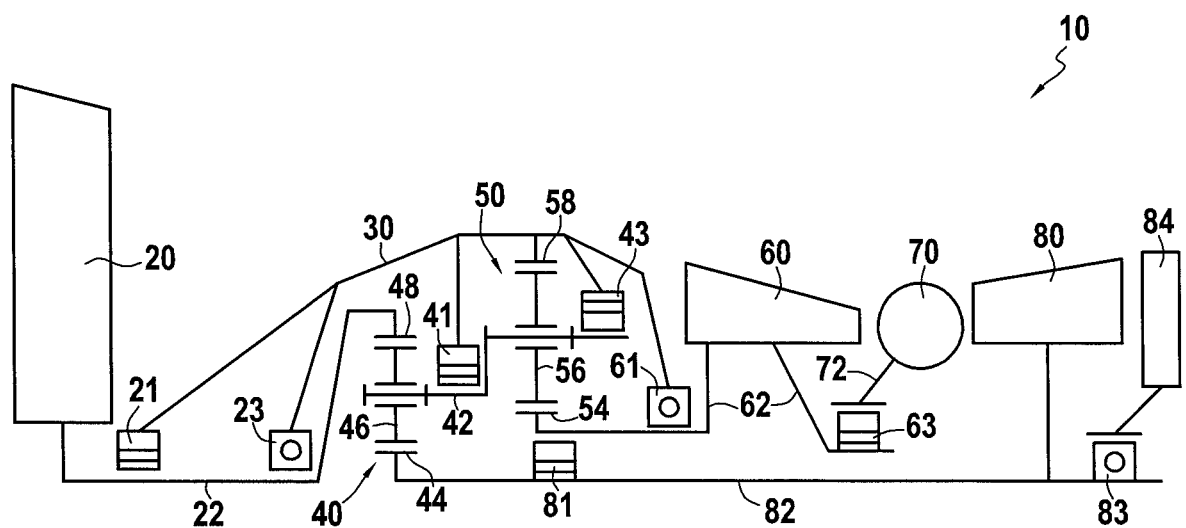
FIG. 2 illustrates schematically an axial half-section of a turbofan according to a second embodiment.

FIG. 2 illustrates in more detail the structure of the turbojet engine 10.

It will be noted firstly that due to the presence of the differential transmission, the fan shaft 22, the compressor shaft 62 and the turbine shaft 82 are separate from each other.

As represented in FIG. 2, the first reduction gear 40 is a differential reduction gear having an input wheel 44, in this case a sun gear (also called sun gear 44), rotatably secured to the turbine 80, here via a turbine shaft 82, and a first output wheel 48, in this case a ring gear (also called ring gear 48), rotatably secured to the fan 20, here via a fan shaft 22. Preferably, the ratio R1 of the number of teeth of the first output wheel 48 to the number of teeth of the input wheel 44 is greater than 1 and is, in this embodiment, approximately equal to 1.5.

The sun gear 44 and the ring gear 48 are engaged by means of planet gears 46. One or more planet gears 46 may be provided. Within the meaning of the present disclosure, the expression "engaged" expresses an inter-engagement of two elements, whether this engagement be mechanical, electromagnetic or of another nature. The planet carrier 42 connected to the planet gear(s) 46 forms the second output wheel of the first reduction gear 40.

Furthermore, the second reduction gear 50 is an epicyclic reduction gear. As indicated above, the second reduction gear 50 has an input wheel rotatably secured to the second output wheel 42 of the first reduction gear 40. In this case, as illustrated in FIG. 2, the planet carrier 42 forms both the second output wheel of the first reduction gear 40 and the input wheel of the second reduction gear 50. As a consequence, the planet carrier 42 also forms a reduction shaft between the first reduction gear 40 and the second reduction gear 50. As a consequence, in this embodiment, the following terms will be used interchangeably: planet carrier 42, reduction shaft, second output wheel of the first reduction gear 40, input wheel of the second reduction gear 50. However, in general, these members may be separate from each other, in which case an outlet of the first reduction gear 40 is rotatably coupled to an inlet of the second reduction gear 50 by a reduction shaft 42.

The transmission shaft 42 is a planet carrier for the first reduction gear 40 and, independently, is also a planet carrier for the second reduction gear 50. Thus, the second reduction gear 50 comprises one or more planet gears 56 the rotation of which is caused by the rotation of the planet carrier 42.

The second reduction gear 50 comprises, in addition to its input wheel 42, an output wheel 54, in this case a sun gear (also called sun gear 54), rotatably secured to the compressor 60, here via a compressor shaft 62. In this embodiment, the sun gear 54 is engaged with the planet gears 56. The planet gears 56 may furthermore be engaged with a ring gear 58, here fixed relative to the casing 30.

Preferably, the ratio R2 of the number of teeth of the ring gear 58 of the second reduction gear 50 to the number of teeth of a planet gear 56 is greater than 2 and is, in this embodiment, approximately equal to 7.

Furthermore, in this embodiment, the aforementioned ratio R1 is smaller than the ratio R2.

The second reduction gear may be dimensioned to have a transmission ratio greater than 3, for example approximately equal to 8.

As can be seen from FIG. 2, the first and second reduction gears 40, 50, are coaxial.

Bearings may be provided to support the aforementioned shafts. In particular, the reduction shaft 42 may be supported by a bearing 41 arranged between the first reduction gear 40 and the second reduction gear 50, so as to improve the dynamic situation of the differential transmission. More specifically, as illustrated in FIG. 2, the bearing 41, in this case a roller bearing, is arranged axially between the first reduction gear 40 and the second reduction gear 50, and radially between the reduction shaft 42 and the casing 30, to support the reduction shaft 42 relative to the casing 30.

If necessary, the reduction shaft 42 may be supported by a second bearing 43. The second bearing 43 may be provided at the front of the first reduction gear 40 or, as represented in FIG. 2, at the rear of the second reduction gear 50. The second bearing 43 may be a roller bearing. The second bearing 43 may be arranged radially between the reduction shaft 42 and the casing 30. The second bearing 43 may support the reduction shaft 42 relative to the casing 30.

Furthermore, the fan shaft 22, the compressor shaft 62 and the turbine shaft 82 may each, independently of each other, be supported by at least one bearing or, in this embodiment, at least two bearings.

According to one example, the fan shaft 22 is supported relative to the casing 30 by a front fan bearing 21 and a rear fan bearing 23. Furthermore, according to one example, the compressor shaft 62 is supported by a front compressor bearing 61 relative to the casing 30, and by a rear compressor bearing 63 relative to a structural member 72 downstream of the compressor, here a combustion chamber casing. Furthermore, according to one example, the turbine shaft 82 is supported by a rear turbine bearing 83 relative to an exhaust casing 84, also known as a "turbine rear frame" (TRF).

Furthermore, the compressor shaft 62 may be coaxial with the turbine shaft 82 and fitted externally on the turbine shaft 62. In this perspective, there may be provided an inter-shaft bearing 81 arranged between the compressor shaft 62 and the turbine shaft 82, particularly radially between these two shafts. The inter-shaft bearing 81 supports the compressor shaft 62 relative to the turbine shaft 82 and allows their relative rotation.

For each of these shafts 22, 62, 82, it may be provided that one of the bearings ensures axial locking of the shaft, for example in the form of a ball bearing, while the other of the bearings allows axial displacement of the shaft, for example in the form of a roller bearing, to avoid static overdetermination while controlling the axial position of the shaft.

In this example, the front fan bearing 21 and the inter-shaft bearing 81 are roller bearings, while the fan and rear turbine bearings 23, 83 are ball bearings. In this example, the front compressor bearing 61 is a ball bearing, while the rear compressor bearing is a roller bearing.

It is noted that to further improve the dynamics, in this case by reducing the length of the concerned shafts 22, 62, 82 so that their natural modes intervene at higher speeds possibly out of the operating speed range of the turbojet engine, it is possible to position the ball bearings 23, 61 as close as possible to the inlet casing of the fan 20 and the compressor 60, respectively. For example, it is possible to place said bearings as close to the inlet casing of the fan 20 and the compressor 60, respectively, as allowed by the geometry of these casings.

As illustrated in FIG. 2, the first bearing 41 supporting the reduction shaft 42 may be a bearing called "high-radius" bearing, that is to say, whose radius is relatively close to that of the casing 30 on which it is fixed. In this case, said bearing 41 is arranged radially outside the compressor shaft 62, the turbine shaft 82 and the reduction shaft 42.

It is noted that due to the simplified structure of the turbojet engine 10, a fortiori for a single-spool engine 10, the distance between the bearings supporting the same shaft can be reduced compared to the currently developed more complex architectures. This results in better rotational dynamics of the components of the turbojet engine 10. In general, decreasing the length to diameter ratio of a shaft allows improving the dynamics of the shaft.

In terms of mass, the inventors estimate the mass gain between 5% and 15% for the turbojet engine 10 of the second embodiment, compared to a conventional two-spool turbofan engine with single reduction gear.

Figure 3:
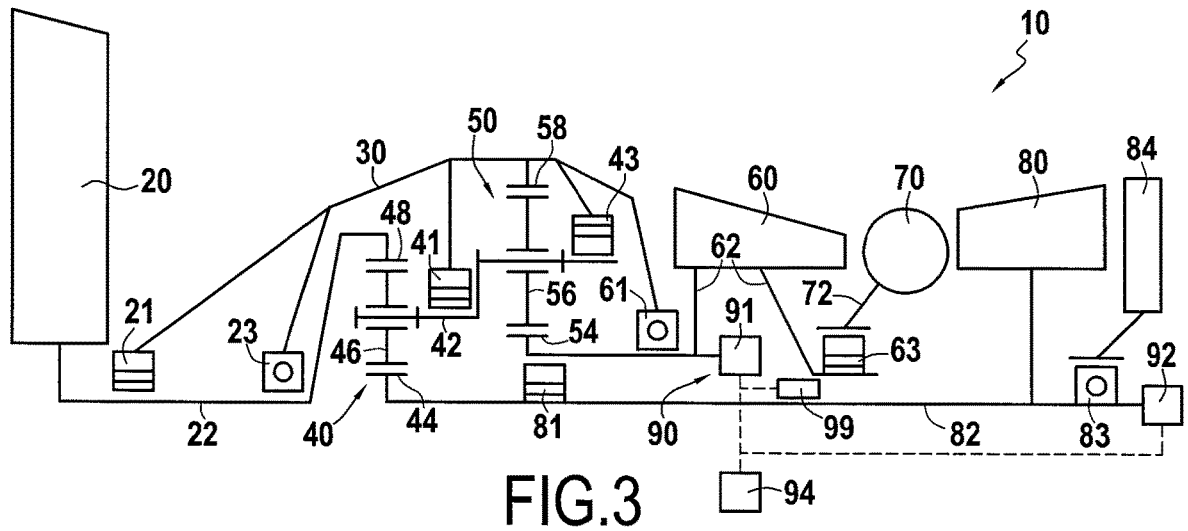
FIG. 3 illustrates schematically an axial half-section of a turbofan according to a third embodiment.
Figure 4:
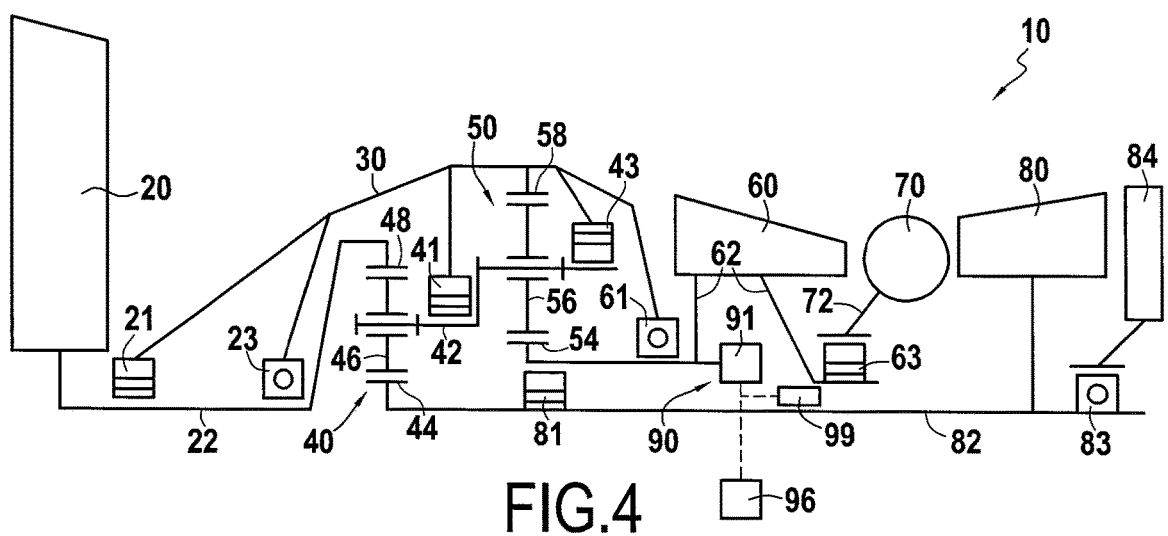
FIG. 4 illustrates schematically an axial half-section of a turbofan according to a fourth embodiment.
Figure 5:
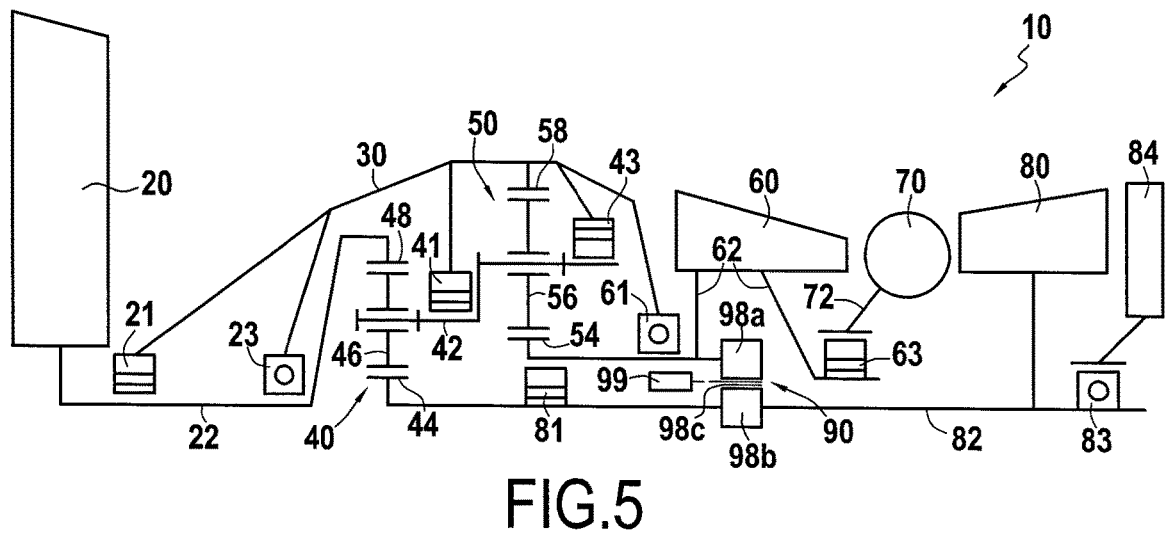
FIG. 5 illustrates schematically an axial half-section of a turbofan according to a fifth embodiment.

In the third to fifth embodiments, represented in FIGS. 3 to 5 respectively, in order to reduce the risk that the compressor 60 is at too low speed when the turbine 80 rotates at idle speed or more generally at a non-zero but low speed, there may be provided a power supply device 90 configured to provide additional power to the one provided by the turbine 80 to drive the compressor 60. Of course, such a power supply device may be compatible with the embodiments described above.

The power supply device can be of various kinds. For example, the power supply device 90 may be configured to provide power coming from a source separate from the turbine 80, said power therefore not being provided, directly or indirectly, instantaneously or in a delayed manner, by the turbine 80. Typically, in the third embodiment, the power supply device 90 comprises an electric motor 91 configured to rotatably drive the compressor 60. As illustrated in FIG. 3, the electric motor 91 may be engaged with the compressor shaft 62. The electrical energy of the electric motor 91 may come from an electric generator 92 configured to be driven by the turbine 80, or more specifically by the turbine shaft 82, in this embodiment.

Alternatively or in addition, the power supply device 90 may comprise a connector 94 configured to be connected to a power supply external to the turbojet engine and to provide the electric motor 91 with the necessary electrical energy, on the understanding that the additional power to drive the compressor 60 despite the idle speed of the turbine 80 is useful essentially when the turbojet engine 10 operates at idle speed, on the ground as well as in flight, for example during the descent phase.

Alternatively or in addition, as illustrated in FIG. 4 with reference to the fourth embodiment, the electrical energy intended to power the electric motor 91 may come from electricity storage means 96 electrically connected to the electric motor. Where appropriate, the electricity storage means 96 may be connected to the electric generator 92 or to the connector 94 illustrated in the third embodiment. According to the configuration, the electricity storage means 96 may act as a buffer to accumulate the energy produced by the electric generator 92 independently of its consumption by the electric motor 91.

The electricity storage means 96 may comprise one or more batteries, or any other adapted storage means.

However, it is not necessary for the power provided by the power supply device 90 to switch in electrical form. In the fifth embodiment, represented in FIG. 5, the power supply device 90 comprises a variable mechanical or electromagnetic transmission coupled on the one hand to the shaft 62 of the compressor 60 and on the other hand to the shaft 82 of the turbine 80. More specifically, the power supply device 90 comprises a first engagement element 98a rotatably secured to the compressor shaft 62, a second engagement element 98b rotatably secured to the turbine shaft 82. The first and second engagement elements 98a, 98b may be variably engaged with each other (which includes the possibility of decoupling them), by means of a mechanical or electromagnetic link 98c. For example, the link 98c may be a clutch, a differential system, an electromagnetic coupler or any other variable transmission of mechanical energy.

The third, fourth and fifth embodiments have in common that the power provided to the compressor 60 by the power supply device 90 is variable and can be controlled. For that purpose, there may be provided a control unit 99 configured to control the power supply device 90. For example, the control unit 99 may control the power supply device based on a rotational speed of the turbine 80 or on another parameter representative of the speed of the turbojet engine 10. For example, it may be useful to activate the power supply device 90 when the turbine rotates at a speed less than or equal to 95% of its maximum rated rotational speed, and to deactivate the power supply device 90 for a rotational speed of the turbine greater than 95% of its maximum rated rotational speed. Thus, even when the turbine 80 is in idle mode, the compressor 60 can be maintained in a stable rotational speed offering good operability, that is to say an ability to maintain the stabilized and transient operating points of the turbomachine at a distance sufficiently far from the aerodynamic instability areas.

The power supply device 90 may be dimensioned so that the maximum additional power provided by the power supply device may be greater than 1.5 Megawatts (MW), preferably greater than or equal to 1, 8 MW, more preferably greater than or equal to 2.1 MW.

Although presented to increase the rotational speed of the compressor 60 when the turbine 80 rotates at idle speed, the power supply device 90 can, incidentally, be used as an assistance to the acceleration of the turbojet engine 10, for example during start-up or during rapid transient maneuvers.

Furthermore, the power supply device may be used as part of a two-spool turbofan engine, which comprises, in addition to the aforementioned compressor and turbine which form a high-pressure spool, a low-pressure compressor or booster and a low-pressure turbine, positioned on either side of the high-pressure spool and forming a low-pressure spool. The low-pressure compressor is driven by the low-pressure turbine. For example, the power supply device may be used to provide power to the high-pressure shaft in order to improve the operability of the high-pressure compressor by lowering its operating line, which is conventionally defined as the locus of points described in the compressor in a system of coordinates [compression ratio; reduced mass flow rate], during all the possible conditions of operation of the engine, particularly between full throttle and idle. When the power supply device is used, the supplied power may be taken from the low-pressure shaft, which improves the operability of the low-pressure compressor by lowering its operating line.

Although the present description refers to specific exemplary embodiments, modifications can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than a restrictive sense.

The invention claimed is:

1. A turbofan, comprising a fan, a casing positioned downstream of the fan and separating a primary flowpath from a secondary flowpath, a compressor, a combustion chamber and a turbine being arranged in the primary flowpath, the turbofan comprising a differential transmission coupled to the turbine, and a power supply device configured to provide additional power to that provided by the turbine to drive the compressor, wherein the differential transmission comprises a first reduction gear configured to modify the rotation speed transmission ratio between the turbine and the fan and a second reduction gear configured to modify the rotation speed transmission ratio between the turbine and the compressor, the second reduction gear being coupled to an output of the first reduction gear different from an output coupled to fan.

2. The turbofan according to claim 1, further comprising a control unit configured to control the power supply device depending on a rotation speed of the turbine.

3. The turbofan according to claim 1, wherein the power supply device comprises an electric motor configured to drive the compressor in rotation.

4. The turbofan according to claim 1, wherein the power supply device comprises an electrical generator configured to be driven by the turbine.

5. The turbofan according to claim 3, comprising electricity storage electrically connected to the electric motor.

6. The turbofan according to claim 1, wherein the power supply device comprises a connector configured to be connected to an external electrical power supply.

7. The turbofan according to claim 1, wherein the power supply device comprises a variable mechanical transmission coupled to the shaft of the compressor and to the shaft of the turbine.

8. The turbofan according to claim 1, wherein the power supply device comprises an electromagnetic transmission coupled to the shaft of the compressor and to the shaft of the turbine.

9. The turbofan according to claim 1, wherein the maximum additional power provided by the power supply device is greater than 1.5 MW.

10. The turbofan according to claim 1, wherein the power supply device is configured to be deactivated when the rotation speed of the turbine is greater than 95% of the nominal maximum rotation speed of the turbine.

11. The turbofan according to claim 1, wherein the turbofan is a single-spool turbofan and the by-pass ratio between the secondary flowpath and the primary flowpath is greater than or equal to 12.

12. The turbofan according to claim 1, wherein a ring gear of the first reduction gear is rotatably secured to the fan and a planet carrier of the first reduction gear is rotatably secured to an input of the second reduction gear.

13. The turbofan according to claim 1, wherein the first reduction gear is a differential reduction gear having an input wheel rotatably secured to the turbine, a first output wheel rotatably secured to the fan, a second output wheel rotatably secured to an input wheel of the second reduction gear, and the second reduction gear is an epicyclic reduction gear having an output wheel rotatably secured to the compressor.

14. The turbofan according to claim 13, wherein the ratio of the number of teeth of the first output wheel of the first reduction gear to the number of teeth of the input wheel of the first reduction gear is greater than 1.

15. The turbofan according to claim 13, wherein the ratio of the number of teeth of the ring gear of the second reduction gear to the number of teeth of the output wheel of the second reduction gear is greater than 2.

16. The turbofan according to claim 13, wherein the ratio of the number of teeth of the first output wheel of the first reduction gear to the number of teeth of the input wheel of the first reduction gear is less than the ratio of the number of teeth of the ring gear of the second reduction gear to the number of teeth of the output wheel of the second reduction gear.

17. The turbofan according to claim 1, wherein the second reduction gear has a transmission ratio greater than 3.

18. The turbofan according to claim 1, wherein the compression ratio of the fan at cruising speed is comprised between 1.3 and 1.45.

19. The turbofan according to claim 1, wherein the compression ratio of the compressor is greater than or equal to 25 at a rotation speed of the compressor of 15,500 revolutions per minute.

20. The turbofan according to claim 1, wherein the overall pressure ratio of the turbofan is greater than or equal to 30 at top of climb.

* * * * *